US010118479B2

(12) United States Patent
Igi et al.

(10) Patent No.: US 10,118,479 B2
(45) Date of Patent: Nov. 6, 2018

(54) IN-WHEEL MOTOR DRIVE DEVICE

(71) Applicant: NTN CORPORATION, Osaka (JP)

(72) Inventors: Taisuke Igi, Shizuoka (JP); Hirokazu Ooba, Shizuoka (JP)

(73) Assignee: NTN CORPORATION, Osaka (JP)

( * ) Notice: Subject to any disclaimer, the term of this patent is extended or adjusted under 35 U.S.C. 154(b) by 41 days.

(21) Appl. No.: 14/916,792

(22) PCT Filed: Sep. 12, 2014

(86) PCT No.: PCT/JP2014/074208
§ 371 (c)(1),
(2) Date: Mar. 4, 2016

(87) PCT Pub. No.: WO2015/037703
PCT Pub. Date: Mar. 19, 2015

(65) Prior Publication Data
US 2016/0214474 A1 Jul. 28, 2016

(30) Foreign Application Priority Data
Sep. 13, 2013 (JP) .................... 2013-190436

(51) Int. Cl.
B60K 7/00 (2006.01)
F16D 55/226 (2006.01)
(Continued)

(52) U.S. Cl.
CPC .......... B60K 7/0007 (2013.01); B60K 17/043 (2013.01); F16D 55/226 (2013.01);
(Continued)

(58) Field of Classification Search
CPC ...... F16D 55/22; F16D 55/228; F16D 55/226; F16D 55/2265; F16D 65/0056;
(Continued)

(56) References Cited

U.S. PATENT DOCUMENTS 4,330,045 A * 5/1982 Myers .................. B60K 7/0007
180/65.51
5,382,854 A * 1/1995 Kawamoto .......... B60K 7/0007
180/65.6
(Continued)

FOREIGN PATENT DOCUMENTS

CN 2813384 9/2006
JP 8-159182 6/1996
(Continued)

OTHER PUBLICATIONS

International Search Report dated Nov. 25, 2014 in corresponding International Application No. PCT/JP2014/074208 (with English translation).
(Continued)

Primary Examiner — James A Shriver, II
Assistant Examiner — Steve Clemmons
(74) Attorney, Agent, or Firm — Wenderoth, Lind & Ponack, L.L.P.

(57) ABSTRACT

An in-wheel motor drive device is provided including a brake caliper which can be easily mounted in position and dismounted. The in-wheel motor drive device includes a hub to which the wheel body of a vehicle wheel is mounted, an electric motor arranged inside of the hub in the width direction of the vehicle so as to be coaxial with the hub, a motor housing in which are received the electric motor, and the brake caliper, which is arranged to clamp a brake disk through a pair of brake pads disposed on both sides of the brake disk. The brake caliper is fixed to the outer periphery of the motor housing by driving bolts radially inwardly, from radially outside, of the motor housing.

3 Claims, 8 Drawing Sheets

(51) Int. Cl.
*F16D 65/00* (2006.01)
*B60K 17/04* (2006.01)
*F16D 55/2265* (2006.01)
*F16D 121/20* (2012.01)
*F16D 55/00* (2006.01)

(52) U.S. Cl.
CPC ..... *F16D 55/2265* (2013.01); *F16D 65/0056* (2013.01); *F16D 65/0075* (2013.01); *B60K 2007/0038* (2013.01); *B60K 2007/0092* (2013.01); *F16D 2055/0008* (2013.01); *F16D 2121/20* (2013.01)

(58) Field of Classification Search
CPC ......... F16D 65/0075; F16D 2055/0008; B60K 7/0007; B60K 17/043; B60K 2007/0038; B60K 2007/0092
See application file for complete search history.

(56) References Cited

U.S. PATENT DOCUMENTS

| | | | | |
|---|---|---|---|---|
| 6,250,439 | B1* | 6/2001 | Matsuzaki | F16D 55/22 188/73.31 |
| 8,887,875 | B2* | 11/2014 | Gherardi | F16D 55/224 188/71.1 |
| 2005/0051390 | A1* | 3/2005 | Toyoda | F16D 55/228 188/71.1 |
| 2005/0061565 | A1 | 3/2005 | Mizutani et al. | |
| 2006/0237267 | A1* | 10/2006 | Brown, II | F16D 55/226 188/73.31 |
| 2008/0053719 | A1 | 3/2008 | Yoshino et al. | |
| 2008/0053726 | A1 | 3/2008 | Marsh et al. | |
| 2011/0132673 | A1 | 6/2011 | Kim | |

FOREIGN PATENT DOCUMENTS

| | | | |
|---|---|---|---|
| JP | 2005-163820 | 6/2005 | |
| JP | 2008-25847 | 2/2008 | |
| JP | 2008-57552 | 3/2008 | |
| JP | 2008-232381 | 10/2008 | |
| JP | 2010-502494 | 1/2010 | |
| JP | 2011-241871 | 12/2011 | |
| JP | 2012-25291 | 2/2012 | |
| JP | WO 2012098958 A1 * | 7/2012 | ........... B60K 7/0007 |
| WO | WO 2013112158 A1 * | 8/2013 | ........... B60K 7/0007 |

OTHER PUBLICATIONS

Written Opinion of the International Searching Authority in corresponding International Application No. PCT/JP2014/074208 (with English translation).

Office Action dated Sep. 5, 2017 in Chinese Application No. 201480046181.X, with English translation of Search Report.

* cited by examiner

IN-WHEEL MOTOR DRIVE DEVICE

TECHNICAL FIELD

This invention relates to an in-wheel motor device mounted in a wheel of an electric vehicle to drive the wheel.

BACKGROUND ART

Known in-wheel motor drive devices are often used to individually driven right and left wheels of an electric vehicle by mounting their electric motors in the wheel bodies of the right and left wheels, respectively. Since use of such in-wheel motor drive devices eliminates the necessity of a differential gear mechanism and a driven shaft, it minimizes energy loss during transmission of power. Since the driving forces of the right and left wheels are individually controlled by the electric motors mounted in the respective wheels, it is possible to improve travel stability of the vehicle.

Such an in-wheel motor drive device is known from the below-identified Patent document 1. The in-wheel motor drive device disclosed in Patent document 1 includes a hub to which is mounted the wheel body of a wheel; an electric motor arranged inside of the hub in the width direction of the vehicle; a speed reducer for reducing and transmitting the rotation of the electric motor to the hub; and a motor housing in which are received the electric motor and the speed reducer. A hub bearing is mounted on the motor housing at its outer end in the width direction of the vehicle to rotatably support the hub.

In a vehicle including an in-wheel motor drive device of this type, it is difficult to mount and dismount a brake caliper of a disk brake, for the following reasons.

The disk brake includes a brake disk mounted to the hub so as to rotate together with the hub, and a brake caliper configured to clamp the brake disk through a pair of brake pads. In a vehicle including no in-wheel motor, the brake caliper is fixed in position by driving bolts in the direction parallel to the axis of the brake disk, from inside in the width direction of the vehicle (see, for example, the below-identified Patent document 2).

The reason why the bolts are driven in from inside, and not from outside, in the width direction of the vehicle is because the brake disk is in the way if an attempt is made to drive the bolts from outside in the width direction of the vehicle. The brake caliper is therefore typically designed such that it can be fixed in position by driving bolts from inside in the width direction of the vehicle.

However, in a vehicle including an in-wheel motor drive device, since its electric motor and speed reducer are arranged inside the brake disk in the width direction of the vehicle, the electric motor and the speed reducer will be in the way when the bolts are driven in from inside in the width direction of the vehicle, thereby making it difficult to mount and dismount the brake caliper.

In the in-wheel motor drive device disclosed in Patent document 1, in order to more easily mount and dismount the brake caliper, the brake disk is formed with through holes through which bolts can be inserted so that by inserting the bolts and a tool through the through holes, the bolts can be driven in, in the direction parallel to the axis of the brake disk from outside in the width direction of the vehicle, whereby the brake caliper is fixed to the motor housing at its axial end surface by driving the bolts.

PRIOR ART DOCUMENTS

Patent Documents

Patent document 1: JP Patent Publication 2011-241871A
Patent document 2: JP Patent Publication 8-159182A

SUMMARY OF THE INVENTION

Object of the Invention

However, in order to mount and dismount the brake caliper using through holes formed in the brake disk such that bolts and a tool can be inserted through the through holes as disclosed in Patent document 1, it is necessary to adjust the angular position of the brake disk so that the through holes formed in the brake disk are aligned with the respective threaded holes formed in the motor housing. Such adjustment is troublesome. Forming the brake disk with the through holes through which the bolts and the tool can be inserted adds to the cost, and thus the unit price, of the brake disk, too.

An object of the present invention is to provide an in-wheel motor drive device of which the brake caliper can be easily mounted and dismounted.

Means for Achieving the Object

In order to achieve the above object, the present invention provides an in-wheel motor drive mechanism comprising:
a hub configured to be mounted to the wheel body of a vehicle wheel;
an electric motor disposed inwardly of the hub in the width direction of the vehicle so as to be coaxial with the hub;
a motor housing in which is mounted the electric motor;
a hub bearing mounted to the outer end of the motor housing in the width direction of the vehicle and rotatably supporting the hub;
a brake disk mounted to the hub so as to rotate together with the hub;
a pair of brake pads disposed on the respective sides of the brake disk; and
a brake caliper configured to clamp the brake disk by means of the brake pads,
wherein the brake caliper is fixed to the outer periphery of the motor housing by driving threaded members radially inwardly of the motor housing from radially outside of the motor housing.

With this arrangement, since the brake caliper is fixed in position by driving the threaded members radially inwardly, from radially outside, of the motor housing, none of the brake disk, the electric motor and the speed reducer will be in the way when attaching and detaching the threaded members, so that the brake caliper can be easily mounted and dismounted. Since it is not necessary to form through holes through which the threaded members and a tool for fixing the brake caliper are to be passed, the brake disk can be manufactured at a low cost.

Preferably, the motor housing includes a large-diameter portion having an outer diameter larger than the diameter of the outer periphery of the brake disk, and the large-diameter portion has an outer periphery formed with a pair of seating surfaces to which the brake caliper is fixed. With this arrangement, since the distance from the rotation axis of the brake disk to the seating surfaces, as viewed in the axial direction of the brake disk, is long, it is possible to reduce the force that acts on the connecting portions between the brake caliper and the seating surfaces, under the braking torque that acts on the brake pads when the rotating brake disk is clamped by the brake pads. This in turn reliably improves the strength with which the brake caliper is fixed in position.

As viewed in the axial direction of the brake disk, the seating surfaces are preferably disposed on the respective circumferential sides of the brake pads such that the brake pads are disposed between the seating surfaces. With this arrangement, since the connecting positions between the brake caliper and the seating surfaces are arranged, as viewed in the axial direction of the brake disk, on or close to the line of action along which force is applied to the brake pads when the rotating brake disk is clamped by the brake pads, it is possible to reduce the moment that acts on the connecting portions between the brake caliper and the seating surfaces, and thus reliably improve the strength with which the brake caliper is fixed in position.

The brake caliper may be a floating type brake caliper including a caliper bracket fixed to the outer periphery of the motor housing, a caliper body supported by the caliper bracket so as to be slidable in the axial direction of the brake disk relative to the caliper bracket, and a pressurizing mechanism mounted in the caliper body and configured to press one of the brake pads against the brake disk.

Alternatively, the brake caliper may be a fixed type brake caliper including a caliper body fixed to the outer periphery of the motor housing, and a pair of pressurizing mechanisms mounted in the caliper body and configured to press the respective brake pads against the brake disk.

Advantages of the Invention

Since the in-wheel motor drive device according to the present invention is configured such that the brake caliper can be fixed in position by driving threaded members radially inwardly, from radially outside, of the motor housing, none of the brake disk, the electric motor and the speed reducer will be in the way when attaching and detaching the threaded members, so that the brake caliper can be easily mounted and dismounted.

BEST MODE FOR EMBODYING THE INVENTION

Figure 1:
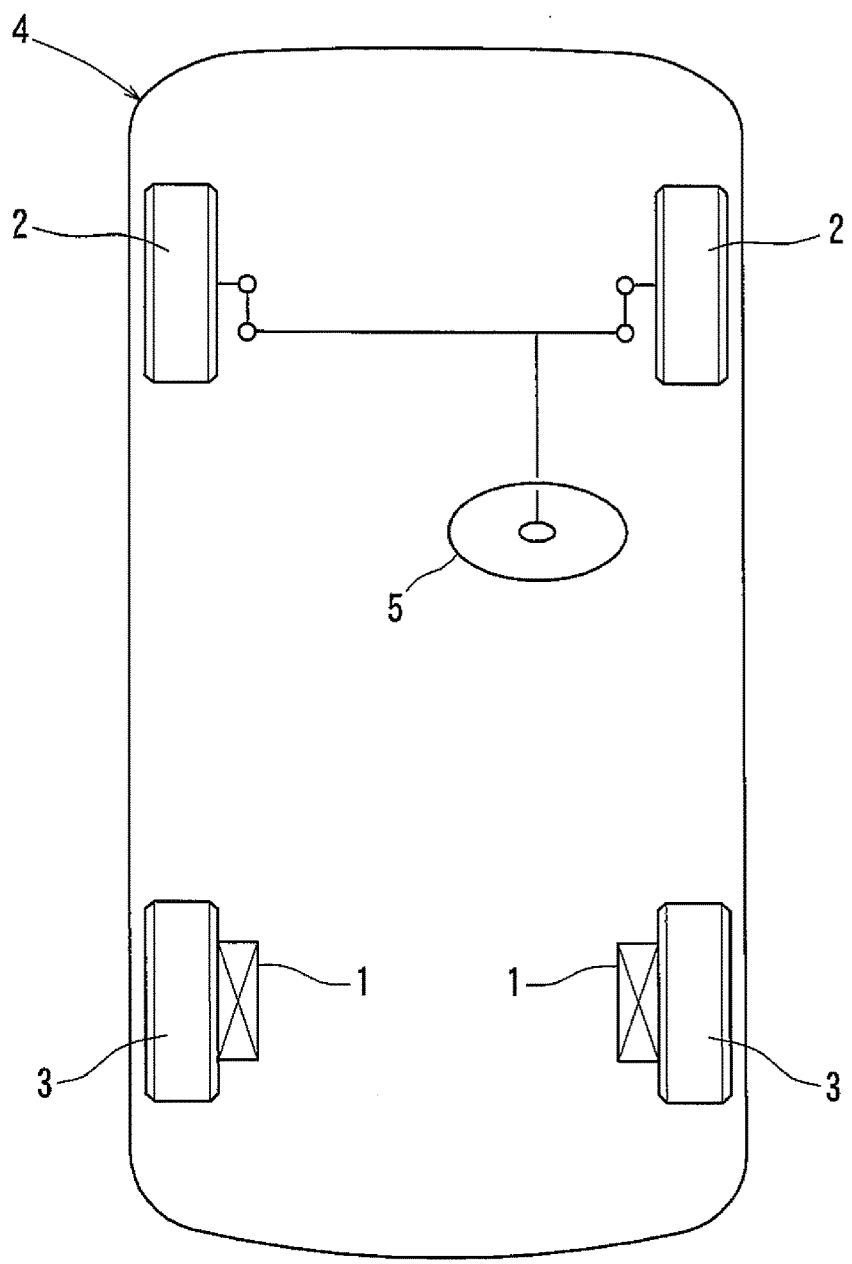
FIG. 1 is a sectional view of an electric vehicle on which are mounted in-wheel motor drive devices embodying the present invention.

An in-wheel motor drive device 1 embodying the present invention will now be described. FIG. 1 shows a vehicle 4 including a pair of right and left front wheels 2, and a pair of right and left rear wheels 3. The vehicle 4 is an electric vehicle of which the right and left front wheels 2 are steered by turning a steering wheel 5, and which includes in-wheel motor drive devices 1 mounted to the respective right and left rear wheels 3 such that the right and left rear wheels 3 are individually driven by the respective in-wheel motor drive devices 1.

While not shown, in-wheel motor drive devices 1 may be mounted to the right and left front wheels 2, in addition to, or instead of, the in-wheel motor drive devices 1 mounted to the right and left rear wheels 3 as shown in FIG. 1. As used herein, "the width direction of the vehicle 4" refers to the right-and-left direction of the vehicle 4, namely, a direction perpendicular to the fore-and-aft direction of the vehicle 4.

Figure 2:
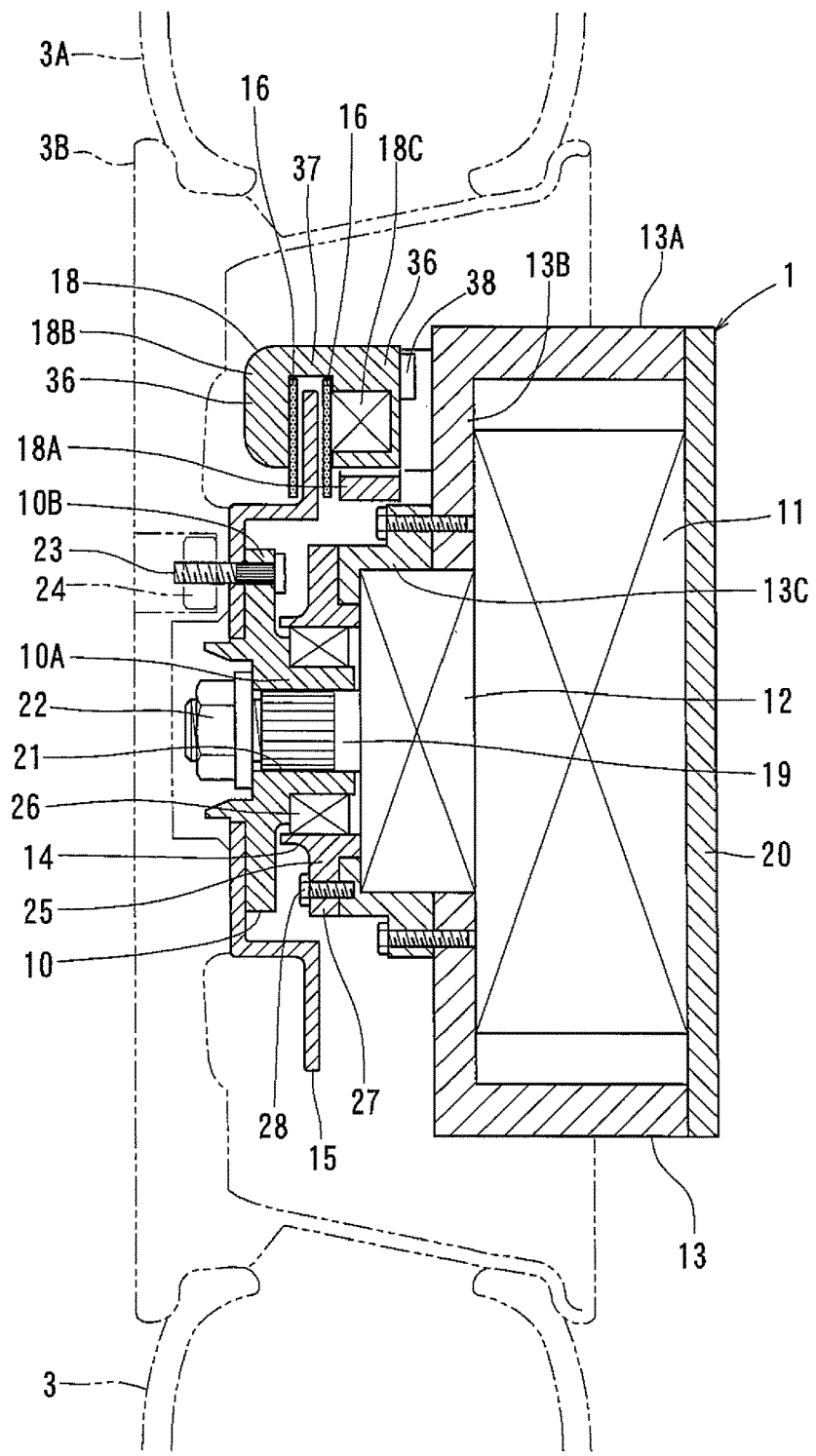
FIG. 2 is a sectional view of the in-wheel motor drive device arranged in the wheel body of one of the rear wheels of the electric vehicle shown in FIG. 1.

As shown in FIG. 2, each of the in-wheel motor drive devices 1 is received in the wheel body 3B of one of the rear wheels 3, which retains the tire 3A of the wheel 3. The in-wheel motor drive device 1 includes: a hub 10 to which the wheel body 3B is mounted; an electric motor 11 located inwardly of the hub 10 in the width direction of the vehicle 4 so as to be coaxial with the hub 10; a speed reducer 12 configured to transmit the rotation of the electric motor 11, after reducing its speed, to the hub 10; a motor housing 13 in which are received the electric motor 11 and the speed reducer 12; a hub bearing 14 mounted to the motor housing 13 at its outer end in the width direction of the vehicle 4; a brake disk 15 mounted to the hub 10 so as to rotate together with the hub 10; a pair of brake pads 16 provided on the respective sides of the brake disk 15; and a brake caliper 18 for clamping the brake disk 15 with the brake pads 16.

The electric motor 11 includes an annular stator, not shown, and a rotor, not shown either, arranged inside the stator, and is configured such that by energizing the stator, the rotor is rotated, whereby the rotation of the rotor is output through the speed reducer 12.

The speed reducer 12 includes an output shaft 19 through which the rotation input from the electric motor 11 is output after being reduced in speed. The speed reducer 12 is of the type in which the center of the rotation input into the speed reducer 12 is aligned with the center of the rotation output from the speed reducer 12. Speed reducers of this type include a planetary gear speed reducer and a cyclo speed reducer.

The motor housing 13 includes a large-diameter portion 13A having an outer diameter larger than the diameter of the outer periphery of the brake disk 15, an end plate 13B provided at the outer end of the large-diameter portion 13A in the width direction of the vehicle 4, and a small-diameter portion 13C extending outwardly in the width direction of the vehicle 4 from the end plate 13B. The large-diameter portion 13A houses the electric motor 11. The small-diameter portion 13C houses the speed reducer 12.

The hub bearing 14, mounted to the motor housing 13 at its outer end in the width direction of the vehicle 4, rotatably supports the hub 10. A lid plate 20 is mounted to the inner end of the motor housing 13 in the width direction of the vehicle 4. The large-diameter portion 13A of the motor housing 13 has, on its outer periphery, a plurality of circumferentially spaced apart suspension connecting portions (not shown) to which a suspension arm having one end thereof connected to the chassis of the vehicle body is connected at the other end.

The hub 10 includes a hub shaft 10A, and a hub flange 10B extending radially outwardly from the outer periphery of the hub shaft 10A. The hub shaft 10A is formed with a spline hole 21 which extends through the center of the hub shaft 10A, and in which the output shaft 19 of the speed reducer 12 is fitted so that the output shaft 19 and the hub 10 rotate together with each other. A spindle nut 22 is fitted on the end of the output shaft 19 of the speed reducer 12, and tightened, to couple together the hub 10 and the output shaft 19 so as to prevent relative axial movement therebetween.

The wheel body 3B is mounted to the hub 10 by means of a plurality of hub bolts 23 fixed to the hub flange 10B while being spaced apart from each other. The wheel body 3B is fixed to the hub flange 10B by threading wheel nuts 24 onto the respective hub bolts 23 with the wheel body 3B superposed on the hub flange 10B so that the hub bolts 23 extend through the wheel body 3B. The brake disk 15 is fixed to the hub flange 10B by being clamped between the wheel body 3B and the hub flange 10B.

The hub bearing 14 includes an outer race 25 surrounding and coaxial with the hub shaft 10A, and a plurality of rolling elements 26 disposed between the outer race 25 and the hub shaft 10A. A flange 27 is integrally formed on the outer periphery of the outer race 25. The small-diameter portion 13C of the motor housing 13 has an outer end in the width direction of the vehicle 4, and the flange 27 is fixed to this outer end of the small-diameter portion by bolts 28. In order to support both radial loads and axial loads applied from the road surface to the hub 10 through the wheel body 3B, a double-row rolling bearing is used as the hub bearing 14. The hub bearing 14 may be a third-generation hub bearing, which includes two rows of rolling elements and has a raceway for the rolling elements of the outer row, in the width direction of the vehicle 4, formed directly on the outer periphery of the hub 10. However, the hub bearing 14 may be a second-generation, or a first-generation hub bearing, too.

Figure 3:
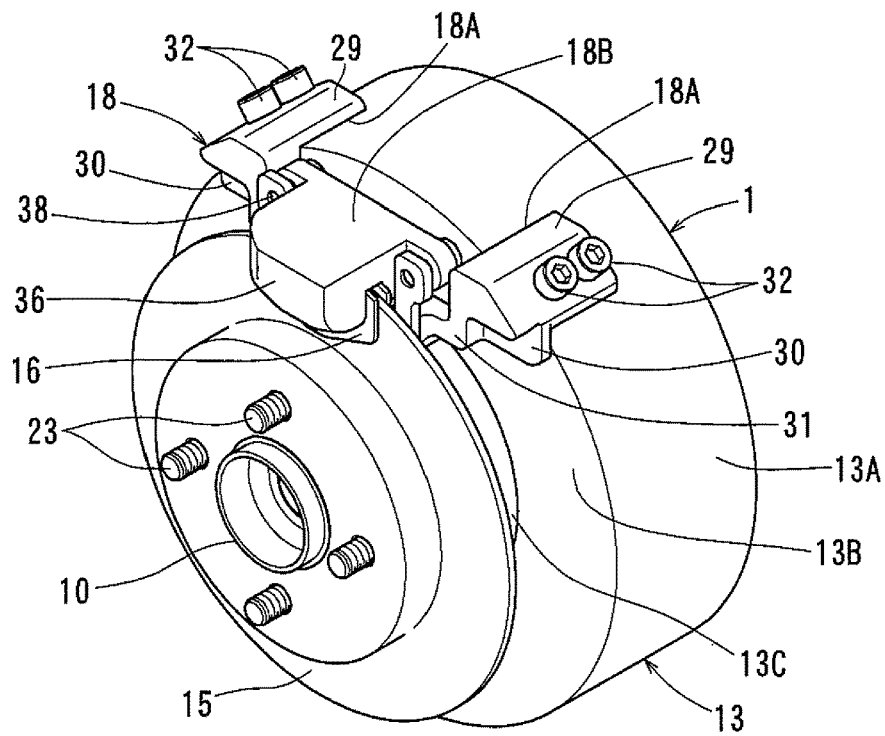
FIG. 3 is a perspective view of the in-wheel motor drive device shown in FIG. 2.
Figure 4:
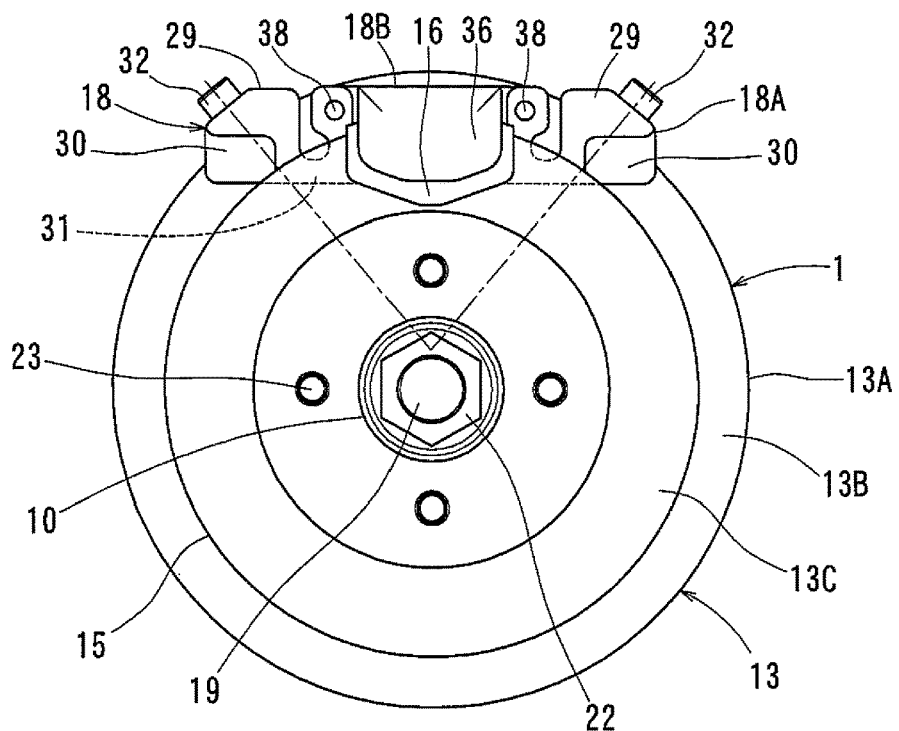
FIG. 4 shows the in-wheel motor drive device shown in FIG. 2, as viewed from outside in the width direction of the vehicle.
Figure 5:
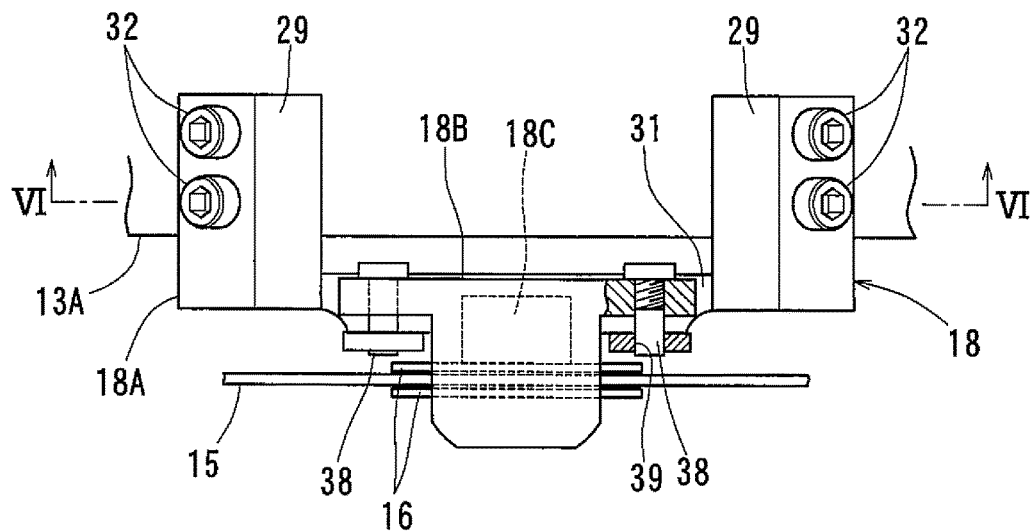
FIG. 5 shows a brake caliper of FIG. 4, as viewed from above.

As shown in FIGS. 3 to 5, the brake caliper 18 includes a caliper bracket 18A fixed to the outer periphery of the large-diameter portion 13A of the motor housing 13 at its two circumferentially spaced apart portions; a caliper body 18B supported by the caliper brackets 18A so as to be slidable in the axial direction of the brake disk 15; and a pressurizing mechanism 18C mounted in the caliper body 18B and configured to press one of the brake pads 16, which is on one side of the brake disk 15, against the brake disk 15.

The caliper bracket 18A includes a pair of base pieces 29 fixed to the outer periphery of the large-diameter portion 13A of the motor housing 13 at its outer end portion in the width direction of the vehicle 4; a pair of inwardly protruding pieces 30 extending radially inwardly along the end plate 13B of the motor housing 13 from the outer ends, in the width direction of the vehicle 4, of the respective base pieces 29, and a coupling arm 31 through which the pair of inwardly protruding pieces 30 are coupled together.

Figure 6:
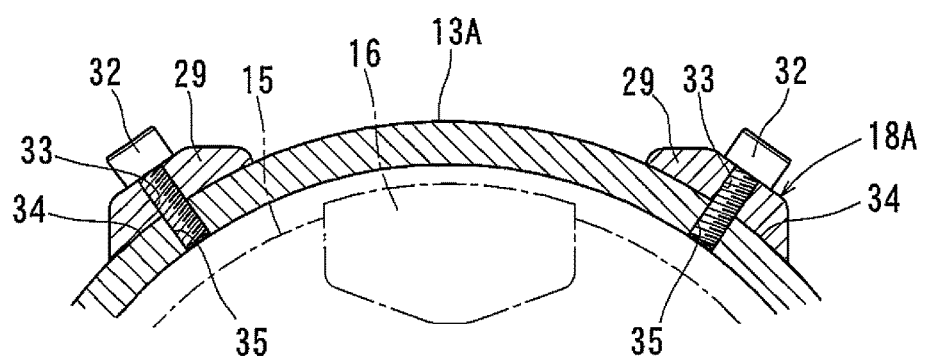
FIG. 6 is a sectional view taken along line VI-VI of FIG. 5.

As shown in FIG. 6, the pair of base pieces 29 are provided at two circumferentially spaced apart positions of the large-diameter portion 13A of the motor housing 13. Each base piece 29 is formed with a plurality of axially spaced apart bolt holes 33 through which bolts 32 are passed (see FIG. 5). The large-diameter portion 13A of the motor housing 13 has, on its outer periphery, a pair of seating surfaces 34 each formed with a plurality of axially spaced apart threaded holes 35. With the bolt holes 33 of the base pieces 29 aligned with the threaded holes 35 of the seating surfaces 34 formed on the outer periphery of the motor housing 13, the bolts 32 are driven in radially inwardly, from the radially outside, of the large-diameter portion 13A of the motor housing 13, to fix the caliper bracket 18A to the seating surfaces 34 on the outer periphery of the large-diameter portion 13A of the motor housing 13.

The inwardly protruding pieces 30, best shown in FIG. 3, are kept in abutment with the end plate 13B of the motor housing 13, and thus improve the strength with which the caliper bracket 18A is fixed to the motor housing 13.

As shown in FIG. 2, the caliper body 18B includes a pair of opposed pieces 36 opposed to each other on the respective sides of the brake disk 15; and a bridge 37 through which the opposed pieces 36 are coupled together. The pressurizing mechanism 18C is mounted in the inner one of the opposed pieces 36 in the width direction of the vehicle 4 (see FIG. 5). The pressurizing mechanism 18C is an actuator located behind the inner one of the brake pads 16, in the width direction of the vehicle 4, and configured to drive this brake pad 16 axially outwardly in the width direction of the vehicle 4 to press it against the brake disk 15. The pressurizing mechanism 18C may be of the hydraulic type, which includes a piston which is advanced toward the brake pad 16 under oil pressure supplied from an oil pump, or an electric type, which includes a piston which is advanced toward the brake pad 16 under the driving force generated by an electric motor.

As shown in FIG. 5, the caliper body 18B is supported by a caliper bracket 18A through a pair of slide pins 38 spaced apart from each other in the circumferential direction of the brake disk 15 and extending in the axial direction of the brake disk 15, so as to be slidable in the axial direction. With this arrangement, when the inner brake pad 16 is pressed against the brake disk 15 by the pressurizing mechanism 18C, the caliper body 18B is slid inwardly in the width direction of the vehicle 4 under the reaction force from the brake disk 15 such that the outer one of the brake pads 16 in the width direction of the vehicle 4 is pressed against the brake disk 15.

In the example shown, the slide pins 38 are fixed to the caliper body 18B and engaged in slide holes 39 formed in the caliper bracket 18A so as to be slidable in the axial direction in the holes 39. Instead of such slide pins 38 and slide holes 39, slide pins fixed to the caliper bracket 18A may be engaged in slide holes formed in the caliper body 18B such that the slide holes are slidable relative to the slide pins in the axial direction.

As shown in FIG. 6, when viewed in the axial direction of the brake disk 15, the seating surfaces 34 on the outer periphery of the motor housing 13 (its portions in contact with the base pieces 29 of the caliper bracket 18A) are located radially outwardly of the outer periphery of the brake disk 15. Also, as viewed in the axial direction of the brake disk 15, the seating surfaces 34 are located on both circumferential sides of each brake pad 16, respectively, such that the brake pads 16 are disposed between the seating surfaces 34. In particular, as seen from the axial direction of the brake disk 15, the pair of seating surfaces 34 are located circumferentially outwardly of the respective circumferential ends of each brake pad 16.

In this in-wheel motor drive device 1, since the brake caliper 18 is fixed in position by driving the bolts 32 radially inwardly, from the radially outside, of the motor housing 13, none of the brake disk 15, the electric motor 11 and the speed reducer 12 will interfere with the bolts 32 when the bolts 32 are driven in or removed, so that the caliper 18 can be easily mounted in position and dismounted. Also, since it is not necessary to form through holes in the brake disk 15 through which the bolts 32 and tools are to be inserted, it is possible to reduce the cost.

In this in-wheel motor drive device 1, since the seating surfaces 34 to which the brake caliper 18 is fixed are provided on the outer periphery of the large-diameter portion 13A of the motor housing 13, the distance from the rotation axis of the brake disk 15 to the seating surfaces 34, as viewed in the axial direction of the brake disk 15, is long. Thus, it is possible to reduce the force that acts on the connecting portions between the brake caliper 18 and the seating surfaces 34, under the braking torque that acts on the brake pads 16 when the rotating brake disk 15 is clamped by the brake pads 16. This in turn reliably improves the strength with which the brake caliper 18 is fixed in position.

In this in-wheel motor drive device 1, since the seating surfaces 34 are located, as viewed in the axial direction of the brake disk 15, on both circumferential sides of the brake pads 16 such that the brake pads 16 are disposed between the seating surfaces 34, the connecting positions between the brake caliper 18 and the seating surfaces 34 are arranged, as viewed in the axial direction of the brake disk 15, on or close to the line of action along which force is applied to the brake pads 16 when the rotating brake disk 15 is clamped by the brake pads 16. This reduces the moment that acts on the connecting portions between the brake caliper 18 and the seating surfaces 34 when the rotating brake disk 15 is clamped by the brake pads 16, and thus reliably improves the strength with which the brake caliper 18 is fixed in position.

Figure 7:
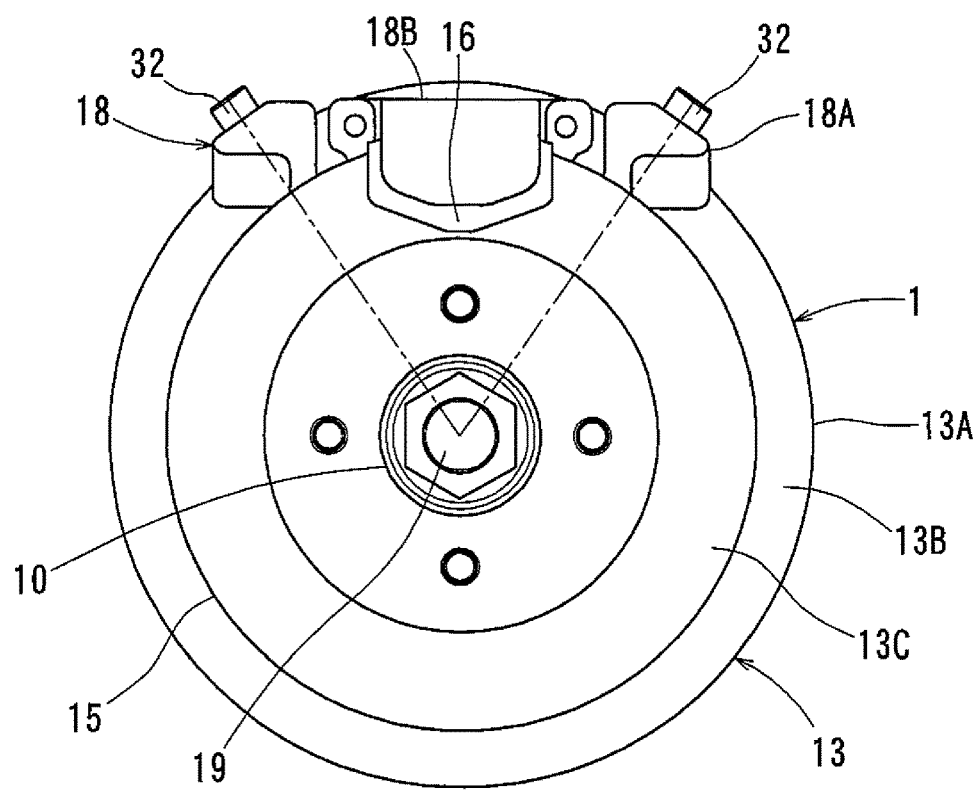
FIG. 7 shows an in-wheel motor drive device according to another embodiment of the present invention, as viewed from outside in the width direction of the vehicle.
Figure 8:
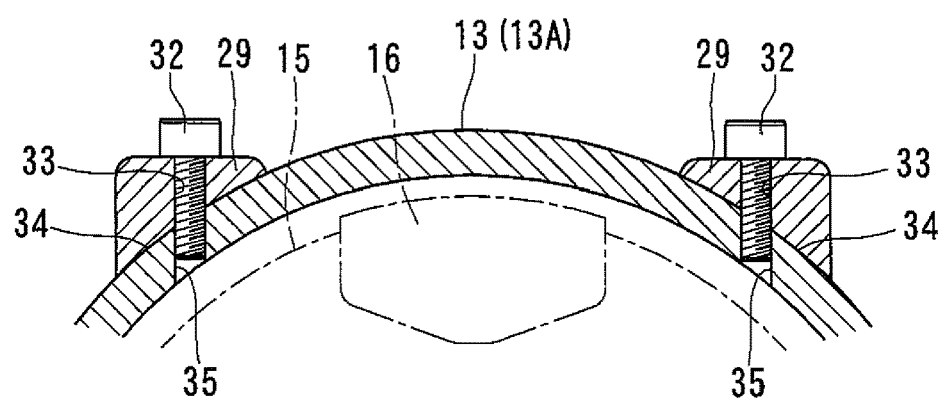
FIG. 8 shows a modification of the in-wheel motor drive device shown in FIG. 6.
Figure 9:
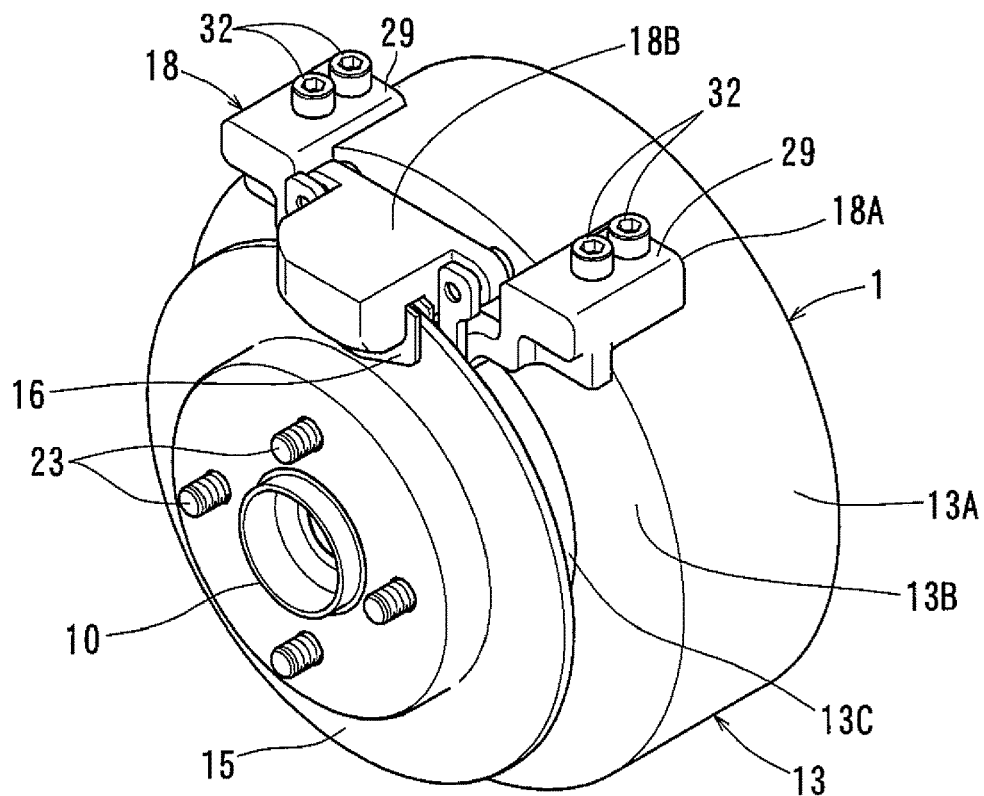
FIG. 9 is a perspective view of the in-wheel motor drive device shown in FIG. 8.

The caliper and the motor housing may be configured, as shown in FIG. 7, such that the center axes of the bolts 32 coincide with the radial directions of the motor housing 13. However, the center axes of the bolts 32 may not coincide with the radial directions of the motor housing 13, provided the bolts 32 can be driven in radially inwardly, from the radially outside, of the motor housing 13. For example, as shown in FIG. 4, the caliper and the motor housing may be configured such that the bolts 32 can be driven in radially inwardly, from radially outside, of the motor housing 13 such that the center axes of the bolts 32 intersect each other at a position offset from the center of the motor housing 13 (i.e. the center of the brake disk 15). Also, as shown in FIGS. 8 and 9, the caliper and the motor housing may be configured such that the bolts 32 can be driven in radially inwardly, from radially outside, of the motor housing 13 such that the center axes of the bolts 32 extend parallel to, while not intersecting, each other.

Figure 10:
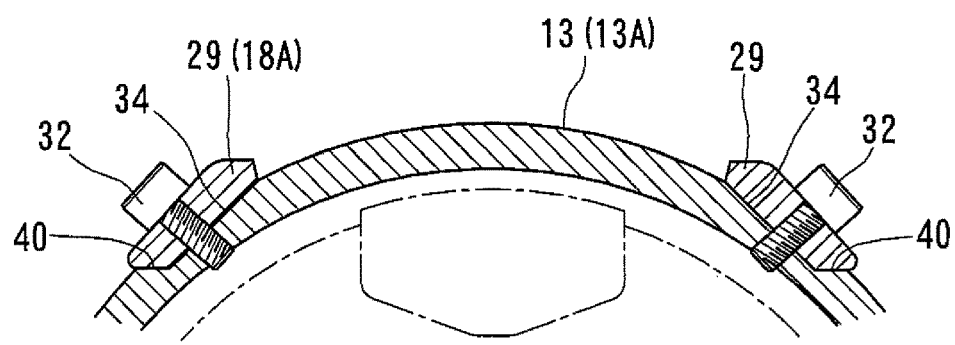
FIG. 10 shows a further modification of the in-wheel motor drive device shown in FIG. 6.
Figure 11:
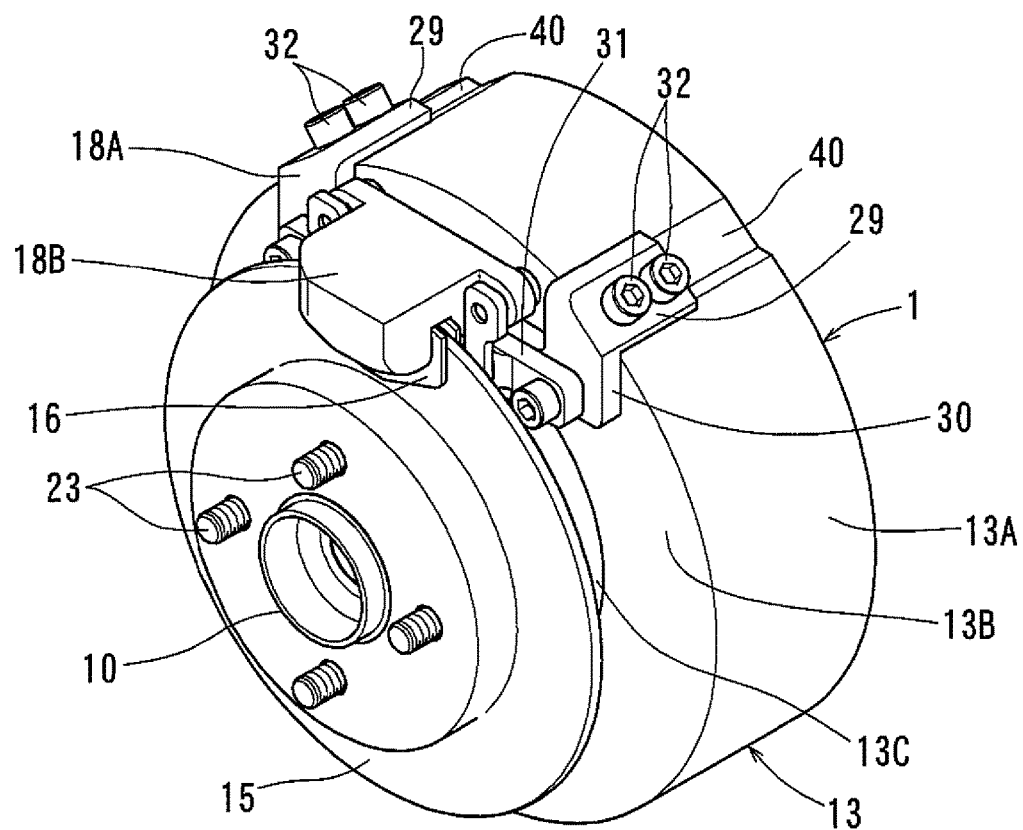
FIG. 11 is a perspective view of the in-wheel motor drive device shown in FIG. 10.

As shown in FIGS. 10 and 11, the seating surfaces 34 may be formed on the inner surfaces of grooves 40 formed on the outer peripheries of the motor housing 30 to extend in the axial direction of the motor housing 30. With this arrangement, it is possible to prevent movement of the base pieces 29 by the engagement of the base pieces 29 in the grooves 40, thereby increasing the strength with which the caliper bracket 18A is fixed to the outer periphery of the motor housing 13.

As shown in FIG. 3, the caliper bracket 18A may be of a seamless integral structure, or as shown in FIG. 11, may comprise a plurality members joined together. In particular, the caliper bracket 18A shown in FIG. 11 includes a pair of base pieces 29 fixed to the outer periphery of the large-diameter portion 13A of the motor housing 13 at its outer end portion in the width direction of the vehicle 4; and a pair of inwardly protruding pieces 30 extending radially inwardly along the end plate 13B of the motor housing 13 from the outer ends, in the width direction of the vehicle 4, of the respective base pieces 29. Each base piece 29 and the corresponding protruding piece 30 form a seamless integral structure. The caliper bracket 18A further includes a coupling arm 31 through which the inwardly protruding pieces 30 are coupled together by means of bolts.

Figure 12:
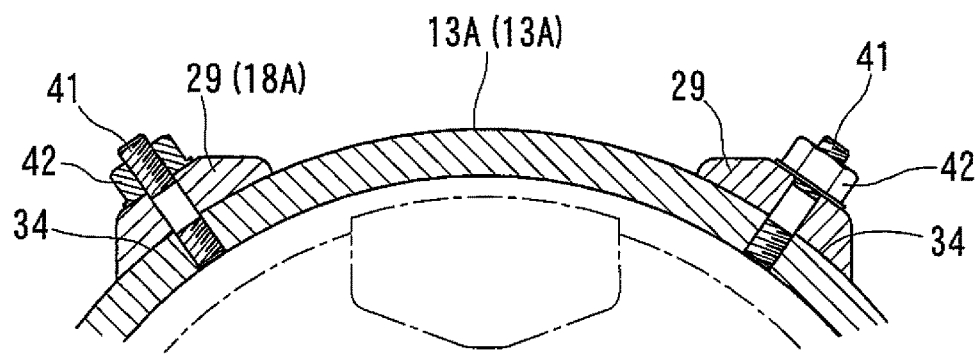
FIG. 12 is a view of an in-wheel motor drive device according to still another embodiment of the present invention, corresponding to FIG. 6.

In the above embodiment, the brake caliper 18 is fixed to the motor housing 13 by driving the bolts 32 radially inwardly, from radially outside, of the motor housing 13. However, the brake caliper 18 may be fixed to the motor housing 13 by threading nuts radially inwardly, from radially outside, of the motor housing 13. For example, as shown in FIG. 12, the caliper bracket 18A may be fixed to the seating surfaces 34 on the outer periphery of the motor housing 13 by threading nuts 42 radially inwardly, from radially outside, of the motor housing 13, onto stud bolts 41 fixed to the seating surfaces 34.

Figure 13:
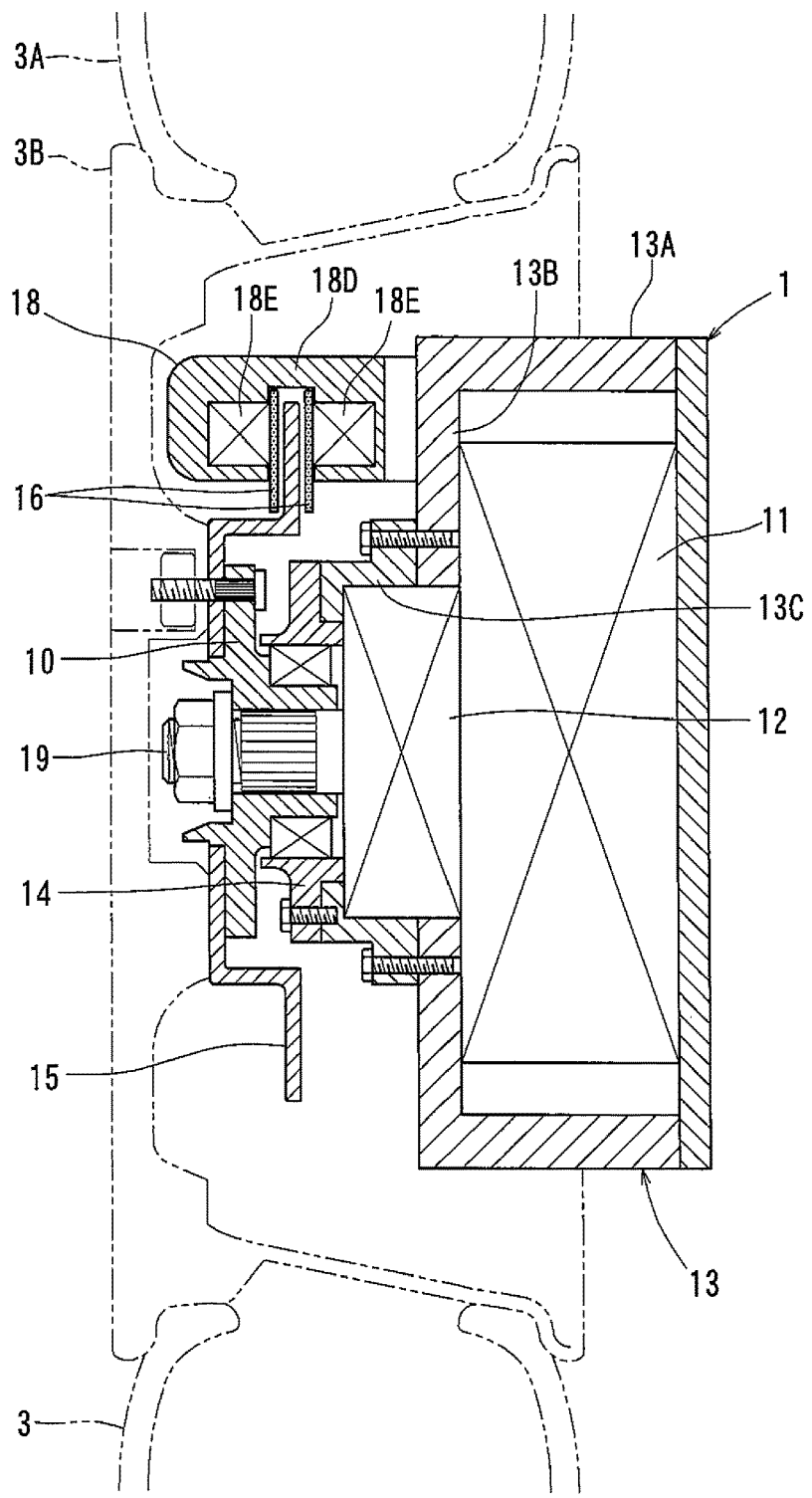
FIG. 13 shows a modification of the in-wheel motor drive device shown in FIG. 2.

The brake caliper 18 of the above embodiment is of the floating type, comprising the caliper bracket 18A fixed to the outer periphery of the motor housing 13, the caliper body 18B slidable in the axial direction of the brake disk 15, relative to the caliper bracket 18A, and the pressurizing mechanism 18C for pressing one of the brake pads 16 against the brake disk 15. However, instead of such a floating type brake caliper 18, a fixed type braking caliper 18 may be used, which is shown in FIG. 13, and includes a caliper body 18D fixed to the outer periphery of the motor housing 13, and a pair of pressurizing mechanisms 18E configured to press respective brake pads 16 on both sides of the brake disk 15 against the brake disk 15. When the fixed type brake caliper 18 is used too, by driving the bolts 32 or the nuts 42 radially inwardly, from radially outside, of the motor housing 13 in the same manner as the previous embodiment, it is possible to fix the caliper body 18D to the outer periphery of the motor housing 13, thereby making it easier to mount and dismount the brake caliper 18.

The speed reducer used in the in-wheel motor drive device 1 according to the present invention may be a cycloid speed reducer, a planetary gear speed reducer, two-parallel-shaft type speed reducer, or any other speed reducer. Otherwise, the in-wheel motor drive device 1 may be what is known as a direct-drive motor type, which includes no speed reducer. As used herein, the term "electric vehicles" are to be understood to refer to all vehicles which use electric power to generate driving force of the vehicles, and thus include hybrid vehicles which use both in-wheel motor drive devices and an internal combustion engine.

DESCRIPTION OF THE NUMERALS

1. In-wheel motor drive device
3. Rear wheel
3B. Wheel body
4. Vehicle
10. Hub
11. Electric motor
12. Speed reducer
13. Motor housing 13A. Large-diameter portion
14. Hub bearing
15. Brake disk
16. Brake pad
18. Brake caliper
18A. Caliper bracket
18B. Caliper body
18C. Pressurizing mechanism
18D. Caliper body
18E. Pressurizing mechanism
32. Bolt
34. Seating surface
42. Nut

What is claimed is:

1. An in-wheel motor drive mechanism comprising:
a hub configured to be mounted to a wheel body of a vehicle wheel;
an electric motor disposed inwardly of the hub in a width direction of a vehicle including the vehicle wheel so as to be coaxial with the hub;
a motor housing in which is mounted the electric motor;
a hub bearing mounted to an outer end of the motor housing in the width direction of the vehicle and rotatably supporting the hub;
a brake disk mounted to the hub so as to rotate together with the hub;
a pair of brake pads disposed on respective sides of the brake disk; and
a brake caliper configured to clamp the brake disk by means of the brake pads,
wherein the brake caliper is fixed to an outer periphery of the motor housing by driving threaded members radially inwardly of the motor housing from radially outside of the motor housing such that center axes of the threaded members coincide with radial directions of the motor housing,
wherein the motor housing includes an end plate located at an outer end, in the width direction of the vehicle, of the motor housing, the end plate extending perpendicular to an axial direction of the motor housing,
wherein the brake caliper includes:
a pair of base pieces fixed to an outer periphery of the motor housing;
a pair of inwardly protruding pieces extending radially inwardly along the end plate of the motor housing from outer ends, in the width direction of the vehicle, of the respective base pieces; and
a coupling arm through which the pair of inwardly protruding pieces are coupled together,
wherein the inwardly protruding pieces are in abutment with the end plate of the motor housing,
wherein the motor housing includes a large-diameter portion having an outer diameter larger than a diameter of an outer periphery of the brake disk, and the large-diameter portion has an outer periphery formed with a pair of seating surfaces to which the brake caliper is fixed,
wherein as viewed in an axial direction of the brake disk, the brake pads are located radially inwardly of the outer periphery of the large-diameter portion, and
wherein as viewed in the axial direction of the brake disk, the seating surfaces are disposed on respective circumferential sides of the brake pads such that the brake pads are disposed between the seating surfaces.

2. The in-wheel motor drive device of claim 1, wherein the brake caliper is a floating type brake caliper including a caliper bracket fixed to the outer periphery of the motor housing, a caliper body supported by the caliper bracket so as to be slidable in the axial direction of the brake disk relative to the caliper bracket, and a pressurizing mechanism mounted in the caliper body and configured to press one of the brake pads against the brake disk.

3. The in-wheel motor drive device of claim 1, wherein the brake caliper is a fixed type brake caliper including a caliper body fixed to the outer periphery of the motor housing, and a pair of pressurizing mechanisms mounted in the caliper body and configured to press the respective brake pads against the brake disk.

* * * * *